(12) United States Patent
L'Ecuyer (10) Patent No.: US 8,398,358 B2
(45) Date of Patent: Mar. 19, 2013

(54) AUTOMOBILE LUGGAGE COMPARTMENT STORAGE DEVICE

(76) Inventor: Jerry L'Ecuyer, Anaheim, CA (US)

( * ) Notice: Subject to any disclaimer, the term of this patent is extended or adjusted under 35 U.S.C. 154(b) by 235 days.

(21) Appl. No.: 12/759,878

(22) Filed: Apr. 14, 2010

(65) Prior Publication Data

US 2011/0255943 A1 Oct. 20, 2011

(51) Int. Cl.
*B60P 1/44* (2006.01)
(52) U.S. Cl. .................. 414/549; 414/522; 414/541
(58) Field of Classification Search .................. 414/522, 414/541, 549
See application file for complete search history.

(56) References Cited

U.S. PATENT DOCUMENTS

| 893,491 | A | * | 7/1908 | Hansen | 414/546 |
| 2,732,960 | A | * | 1/1956 | Nilson | 414/549 |
| 4,616,972 | A | * | 10/1986 | McFarland | 414/749.1 |
| 4,950,123 | A | * | 8/1990 | Brockhaus | 414/522 |
| 4,958,979 | A | * | 9/1990 | Svensson | 414/549 |
| 5,253,973 | A | * | 10/1993 | Fretwell | 414/558 |
| 5,829,945 | A | * | 11/1998 | Stanley | 414/477 |
| 5,904,281 | A | * | 5/1999 | Mooers | 224/526 |
| 5,975,830 | A | * | 11/1999 | Goodrich et al. | 414/541 |
| 6,019,567 | A | * | 2/2000 | Lutkus et al. | 414/549 |
| 6,227,791 | B1 | * | 5/2001 | Jarvinen et al. | 414/541 |
| 6,435,804 | B1 | * | 8/2002 | Hutchins | 414/540 |
| 6,701,913 | B1 | * | 3/2004 | LeDuc et al. | 126/276 |
| 7,306,421 | B2 | * | 12/2007 | Wolfe | 414/541 |

FOREIGN PATENT DOCUMENTS

AU 2007229415 A1 5/2009

* cited by examiner

*Primary Examiner* — James Keenan
(74) *Attorney, Agent, or Firm* — John R. Ross; John R. Ross, III (57) ABSTRACT

A luggage compartment storage device for moving a heavy item from a low easy access point to a high storage surface. A base frame is rigidly mounted to the high storage surface. A slide is connected to the base frame. A sliding frame is connected to the slide. Rear swing arms and front swing arms are pivotally connected to the sliding frame. A damper is connected between the rear swing arms and the sliding frame. A platform support frame is pivotally connected to the front swing arms and the rear swing arms. A platform is supported by the platform support frame. A pull down handle is pivotally connected to the front swing arms. The position of the pull down handle is lockable. A locking device is used for locking the platform support frame in place when the platform is at the high storage surface. The user manipulates the pull down handle to move the heavy item between the high storage surface and the low easy access point. In a preferred embodiment, the heavy item is a cooler and the base frame is rigidly mounted to shelving installed in the luggage compartment of an SUV. In another preferred embodiment, a cutting board is sliding attached to the bottom of the platform support frame. In other preferred embodiments the storage device is utilized for storage assistance in work vehicles, workshops, garages, basements, stock rooms, motor homes, closets and for assisting in disabled access.

10 Claims, 11 Drawing Sheets

AUTOMOBILE LUGGAGE COMPARTMENT STORAGE DEVICE

BACKGROUND OF THE INVENTION

An automobile is a self-propelled passenger vehicle that usually has four wheels and an internal-combustion engine. For example, automobiles include sports cars, family cars, 4-wheel drive Sport Utility Vehicles (SUVs) and trucks. In the United States there is at least one automobile in over 90% of all households. The automobile serves a very practical purpose. It transports individuals to work, it drives the kids to school and to their soccer practices. The automobile is also used to drive to the market to purchase food for the family.

Additionally, the automobile is also used for recreation. It is very common for individuals, couples and families to use the automobile for transportation to a vacation destination, a day picnic or a camping trip.

Especially, with the recent economic crisis, families are looking to relax and have fun, but also save money. Hence, camping trips have become a recent source of enjoyment for many people. On a camping trip, it is common for a family of seasoned campers to place shelving into the luggage compartment of their SUV to help organize the gear for their trip. Space for coolers and food are also needed for tailgate parties at football games. However, the cooler is a large heavy item and usually does not fit inside the shelving. Instead it is usually lifted high and placed on top of the shelving. This can be a physical challenge to accomplish, even for a strong man. Done incorrectly, it can even be dangerous. For example, it would be very easy for the lifter of the heavy cooler to hurt his back or drop to cooler on his foot.

What is needed is a storage device for storing heavy large items in the luggage compartment of automobiles.

SUMMARY OF THE INVENTION

The present invention provides a luggage compartment storage device for moving a heavy item from a low easy access point to a high storage surface. A base frame is rigidly mounted to the high storage surface. A slide is connected to the base frame. A sliding frame is connected to the slide. Rear swing arms and front swing arms are pivotally connected to the sliding frame. A damper is connected between the rear swing arms and the sliding frame. A platform support frame is pivotally connected to the front swing arms and the rear swing arms. A platform is supported by the platform support frame. A pull down handle is pivotally connected to the front swing arms. The position of the pull down handle is lockable. A locking device is used for locking the platform support frame in place when the platform is at the high storage surface. The user manipulates the pull down handle to move the heavy item between the high storage surface and the low easy access point. In a preferred embodiment, the heavy item is a cooler and the base frame is rigidly mounted to shelving installed in the luggage compartment of an SUV. In another preferred embodiment, a cutting board is sliding attached to the bottom of the platform support frame. In other preferred embodiments the storage device is utilized for storage assistance in work vehicles, workshops, garages, basements, stock rooms, motor homes, closets and for assisting in disabled access.

BRIEF DESCRIPTION OF THE DRAWINGS

FIGS. 4A-14B show a sequence of operations of the first preferred embodiment of the present invention.

DETAILED DESCRIPTION OF PREFERRED EMBODIMENTS OF THE PRESENT INVENTION

Figure 1:
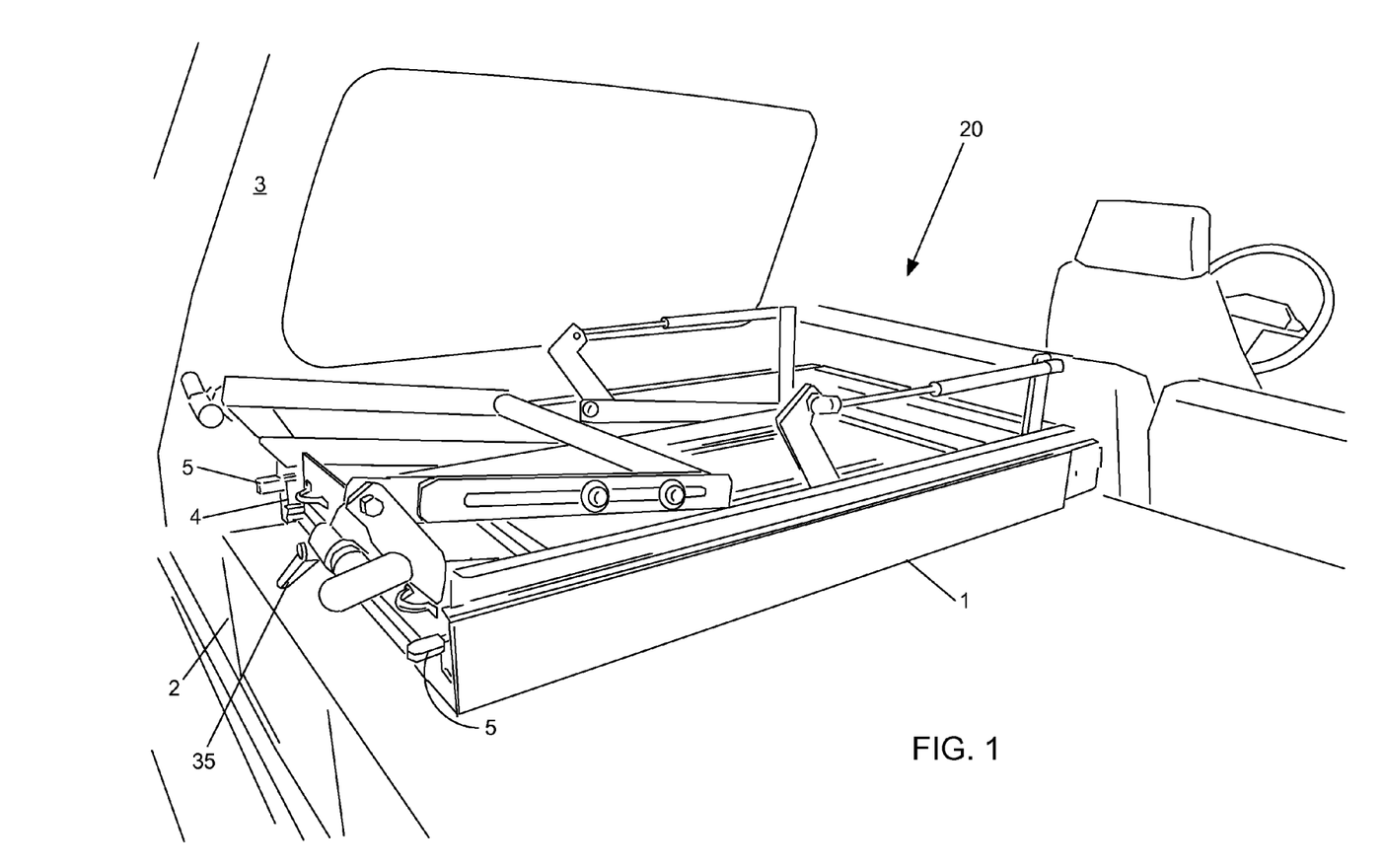
FIGS. 1-3 show perspective views of a first preferred embodiment of the present invention.
Figure 2:
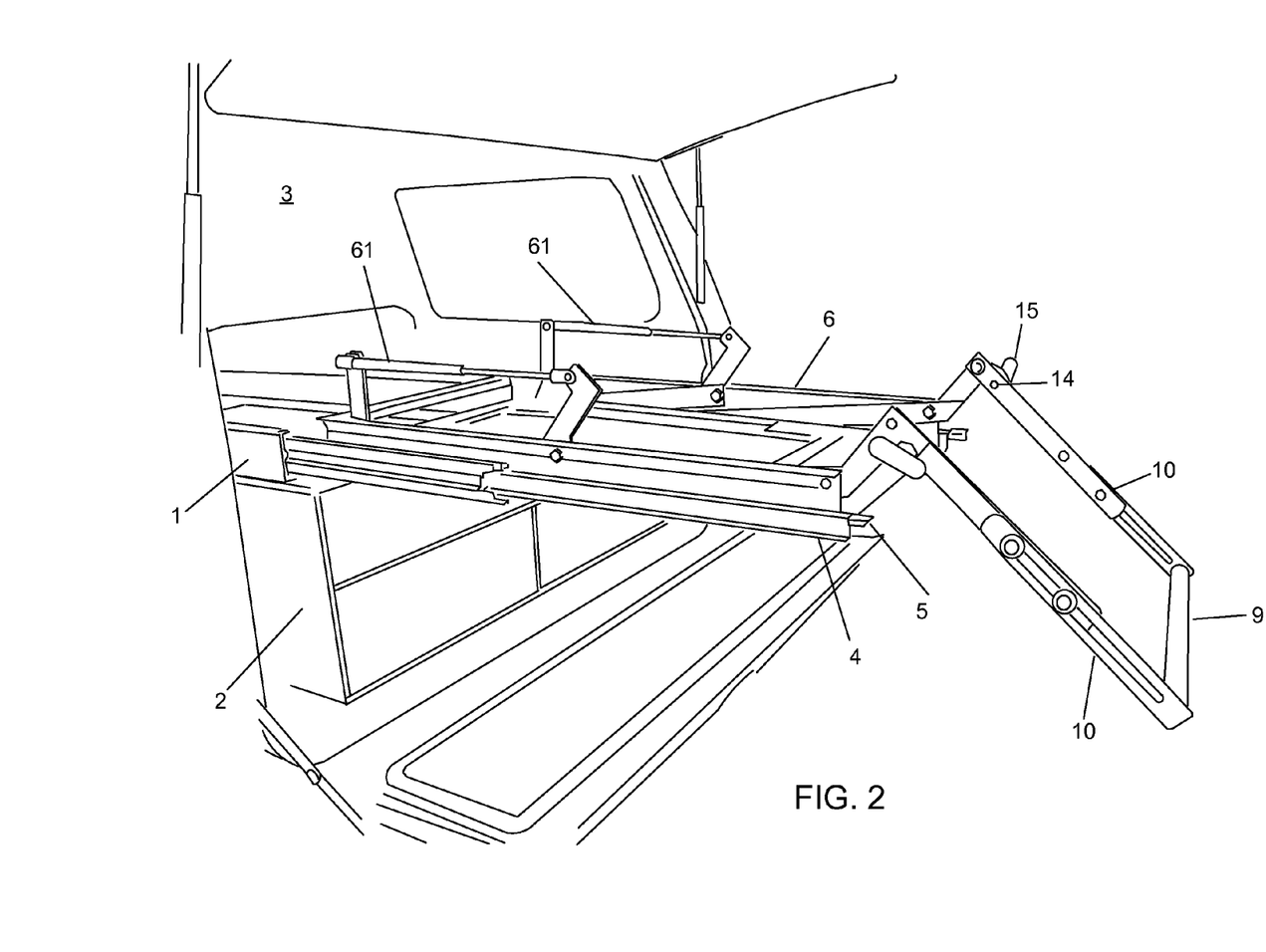
Figure 3:
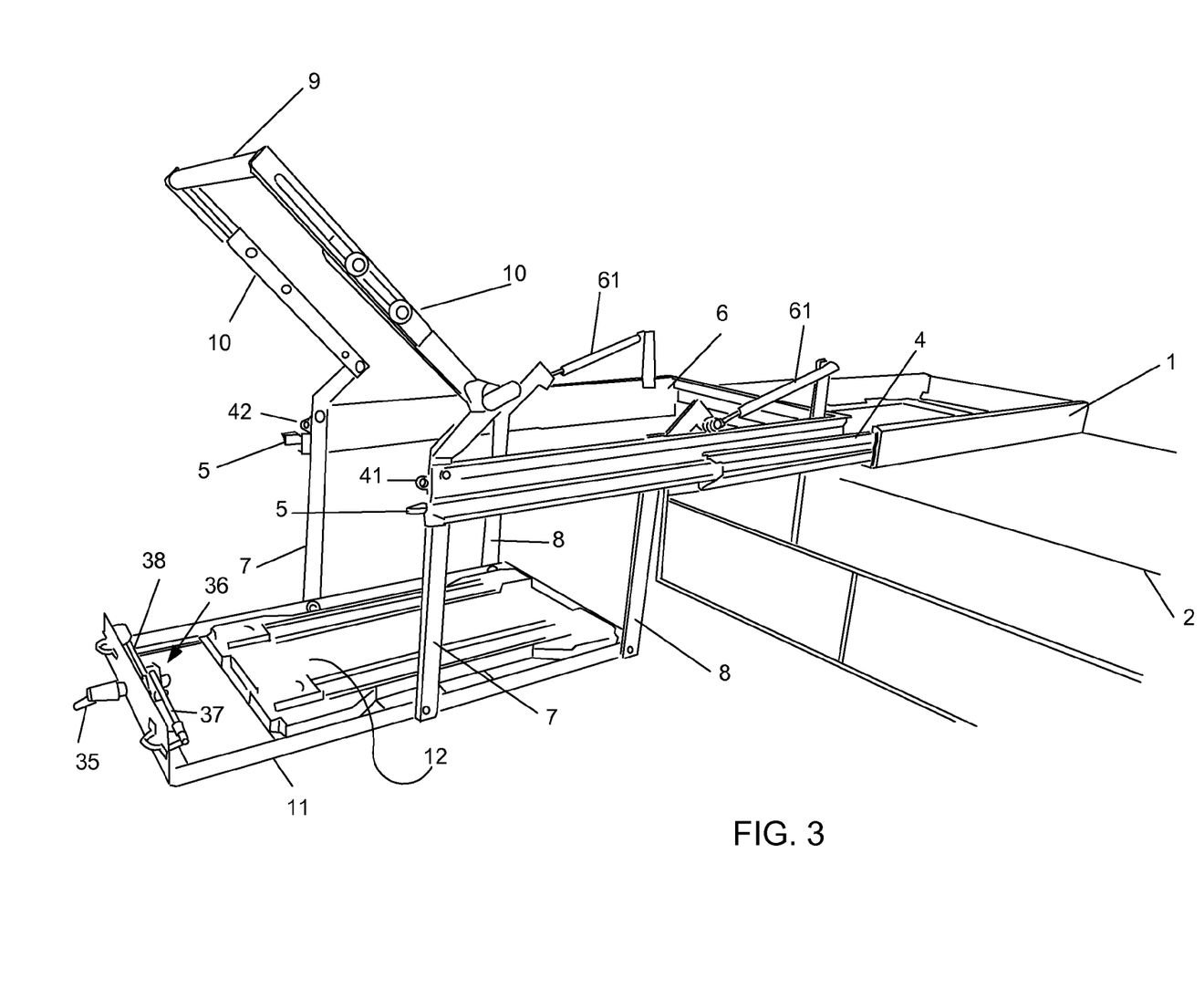

FIGS. 1-3 show perspective views of a first preferred embodiment of the present invention. Storage shelves 2 have been placed in the back of SUV 3. Metal base frame 1 has been bolted to the top of storage shelves 2. Locking slide track 4 is attached to the inside of metal base frame 1. Sliding frame 6 is attached to the inside of locking slide track 4. Front swing arms 7 and rear swing arms 8 are pivotally attached to sliding frame 6. Pull down handle 9 is attached to front swing arms 7 via handle arms 10. Platform support 11 is pivotally connected to front swing arms 7 and rear swing arms 8. Platform 12 is supported by platform support 11, as shown.

By first pressing tabs 5, the user can unlock locking slide 4. He can then pull on pull down handle 9 to move platform 12 to the position shown in FIG. 3. He pulls down on pull down handle 9 to raise platform 12 to the position shown in FIG. 2. The raising and lowering motion of platform 12 is dampened by gas dampers 61 pivotally connected between sliding frame 6 and rear swing arms 8. Items stored on platform 12 are then easily accessible by the user.

Locking Slide Track

In the first preferred embodiment, a preferred locking slide track 4 is available from the Accuride Corporation with offices in Santa Fe Springs, Calif. (model no. 9308). Locking slide track 4 is locked and unlocked by manipulating tabs 5. For example, by pressing on tab 5, the user is able to release locking slide track 4 from the position shown in FIG. 1. Locking slide track 4 can then be pulled to the position shown in FIG. 3. It can then be locked into the position shown in FIG. 3 by again pressing on tabs 5. To release locking slide track 4 from the position shown in FIG. 3, the user again presses on tabs 5 and locking slide track 4 can be returned to the position shown in FIG. 1.

In addition to the locking feature of locking slide track 4, storage device 20 is locked in the position shown in FIG. 1 by utilization of cam lever 35. To unlock storage device 20 the user turns cam lever 35 of cam 36. A perspective view of cam 36 is shown in FIG. 3. Turning of cam lever 35 causes rods 37 and 38 to disengage from rod receiving holes in rod tabs 41 and 42. Rod tabs 41 and 42 are rigidly attached to front swing arms 7 as shown (FIG. 3). When storage device 20 is in the position shown in FIG. 1, rod tabs 41 and 42 are aligned to receive rods 37 and 38.

Operation of the First Preferred Embodiment

It should be noted that FIGS. 4A-24 are drawn in two dimensions. Therefore, it should be understood that minor images are sometimes hidden from view. For example there are two expandable handle arms 10. However, only one expandable handle arm 10 is viewable in FIG. 5A. When describing motion or features related to one expandable handle arm 10, it should be understood that the same motion or features applies to the other expandable handle arm 10.

Figure 4A:
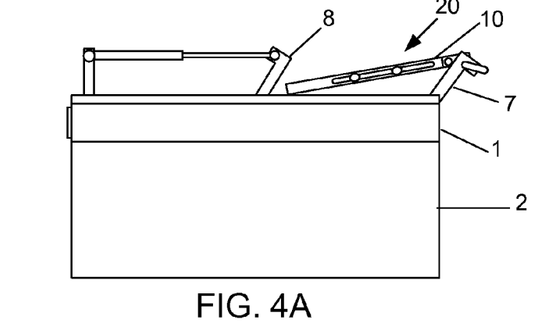

In FIG. 4A, storage device 20 is in the position shown in FIG. 1. The position shown in FIG. 4 is referred to as the "travel position". In the travel position, locking slide track 4 is locked into place preventing unwanted sliding motion while the vehicle is being driven.

Figure 4B:
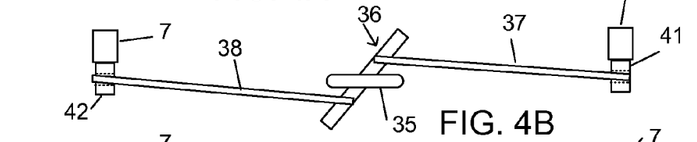
Figure 4C:
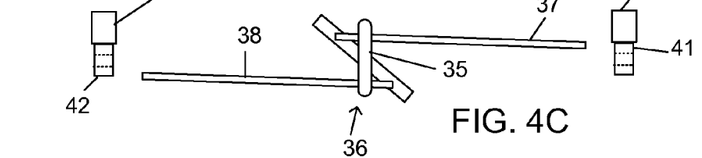

In FIG. 4B, the user has turned cam lever 35 so that it is horizontal. In FIG. 4C, rods 37 and 38 have been pulled clear of the holes in tabs 41 and 42, respectively.

Figure 5A:
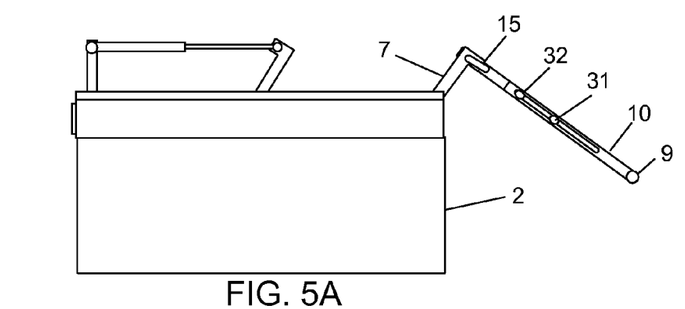
Figure 5B:
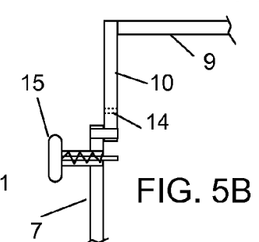
Figure 5C:
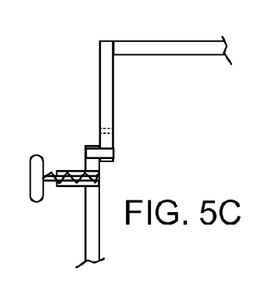
Figure 5D:
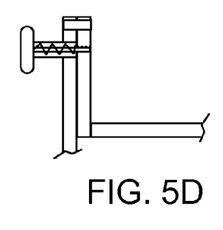

In FIG. 5A, the user has expanded the length of handle arms 10. Pins 31 and 32 hold it in the new position. The user has also rotated pivotally attached handle arms 10 clockwise and locked them into place by utilizing pull pins 15. For example, in FIG. 5B, handle arms 10 are in the position shown in FIG. 4. In FIG. 5C, the user has pulled pull pins 15. In FIG. 5D, the user has released pull pins 15 so that they engage holes 14 (FIG. 5B). In FIG. 5D, handle arms 10 with pull down handle 9 are in the same position shown in FIG. 5A.

Figure 6:
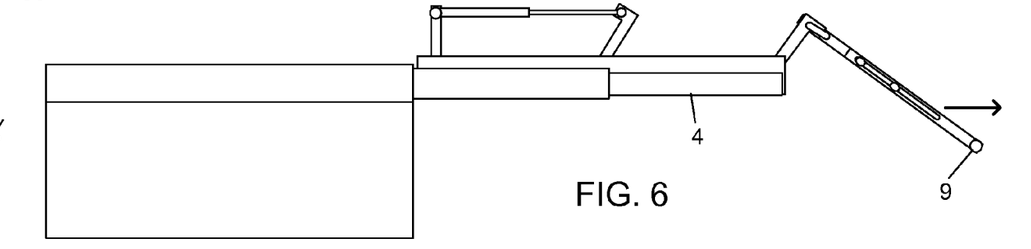

In FIG. 6 the user has pulled pull down handle 9 causing locking slide track 4 to slide outward. This position is also shown in perspective in FIG. 2.

Figure 7:
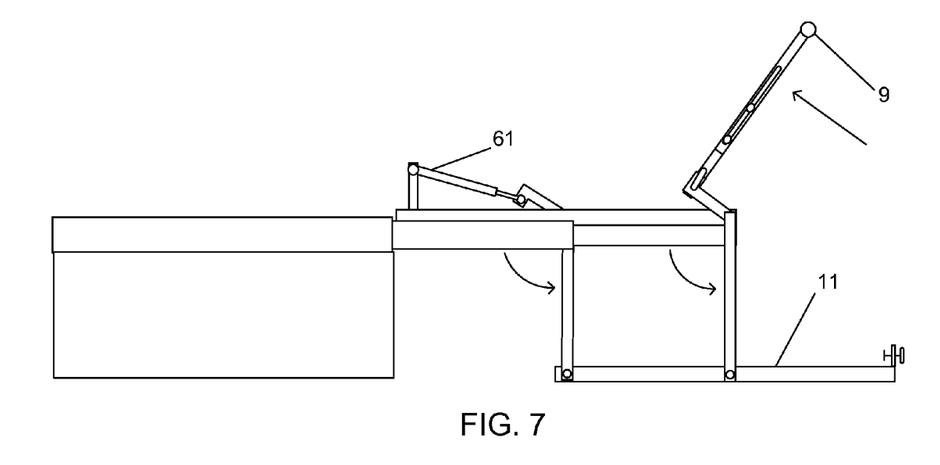

In FIG. 7, the user has pushed up on handle 9 to causing front swing arms 7 and rear swing arms 8 to pivot counter-clockwise. The motion is resisted by gas damper 61 Platform support 11 is in the position shown and is now able to receive a heavy cooler.

Figure 8:
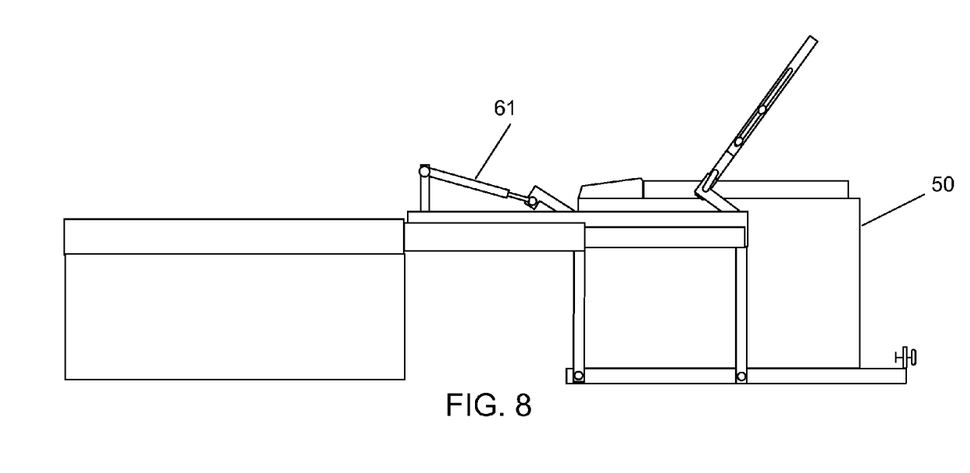

In FIG. 8, the user has placed cooler 50 onto platform 12 (FIG. 3).

Figure 9:
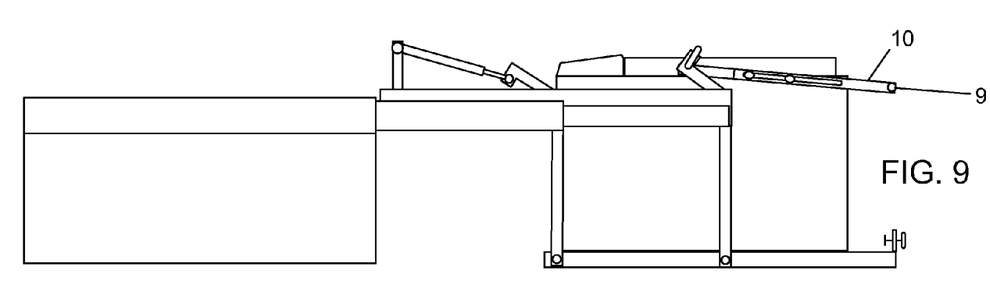

In FIG. 9, the user has unlocked expandable arm 10 so that handle 9 is in the position shown.

Figure 10:
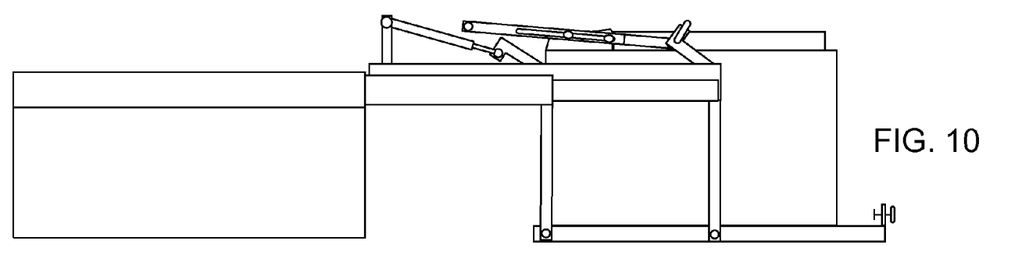
Figure 10B:
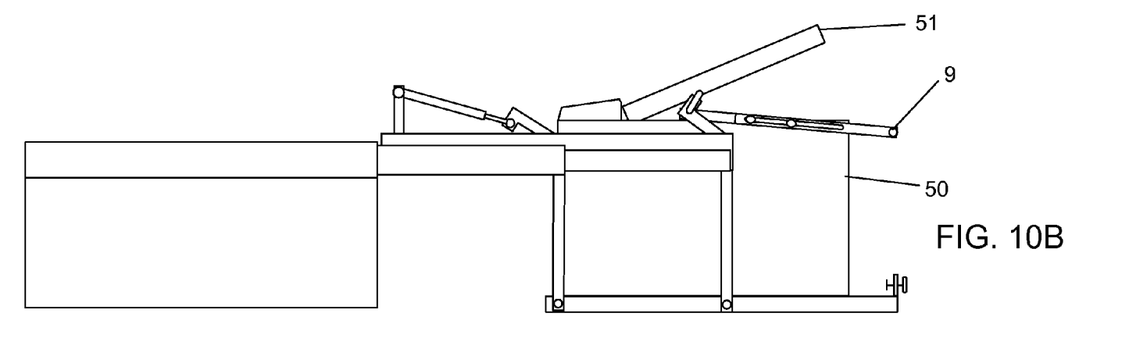

In FIG. 10, the user has rotated handle 9 counterclockwise. The user is able to easily access the lid of cooler 50 while handle 9 is either the position shown in FIG. 9 or 10. For example, in FIG. 10B the user has easily opened lid 51 of cooler 50.

Figure 11:
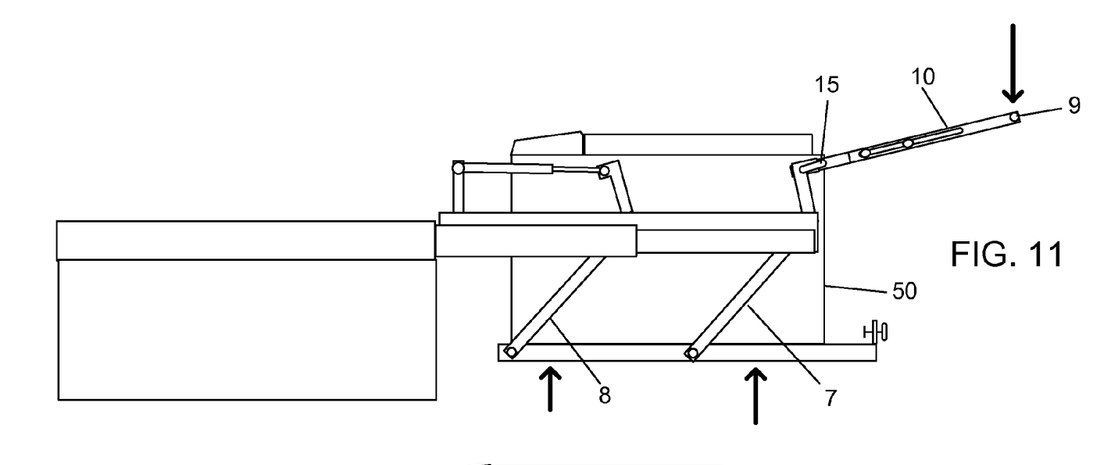

In FIG. 11, the user has locked expandable arm 10 back into place utilizing pull pin 15. The user is pushing down on handle 9 causing forward swing arm 7 and rear swing arm 8 to rotate clockwise. This causes pivotally attached platform support 11 to lift upward as shown raising cooler 50.

Figure 12:
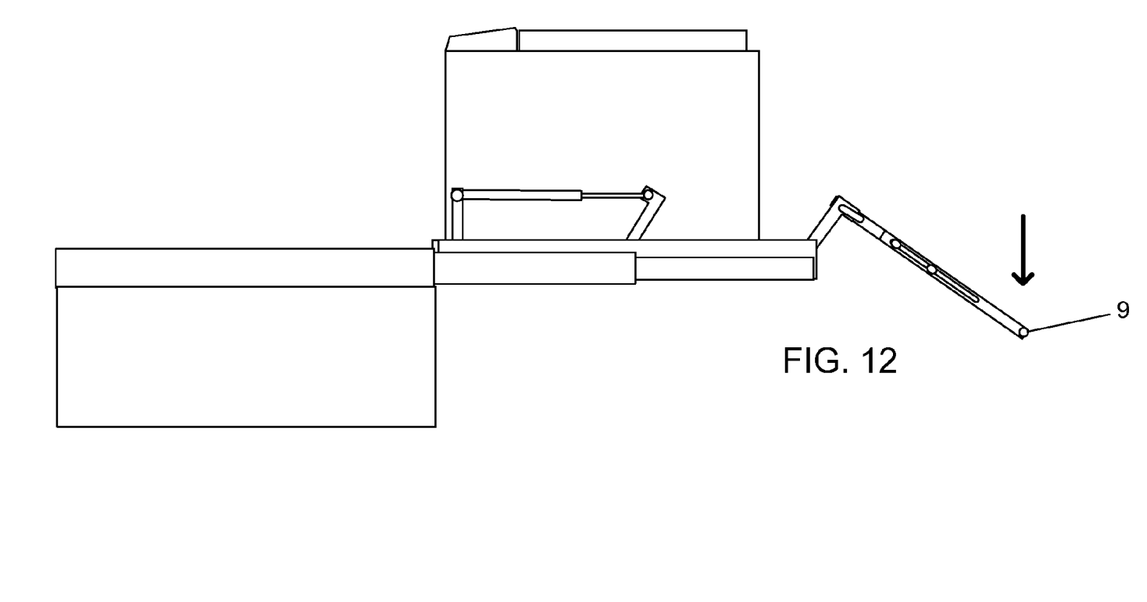

In FIG. 12, the user has continued to push downward on handle 9 so that the cooler is in the raised position shown.

Figure 13:
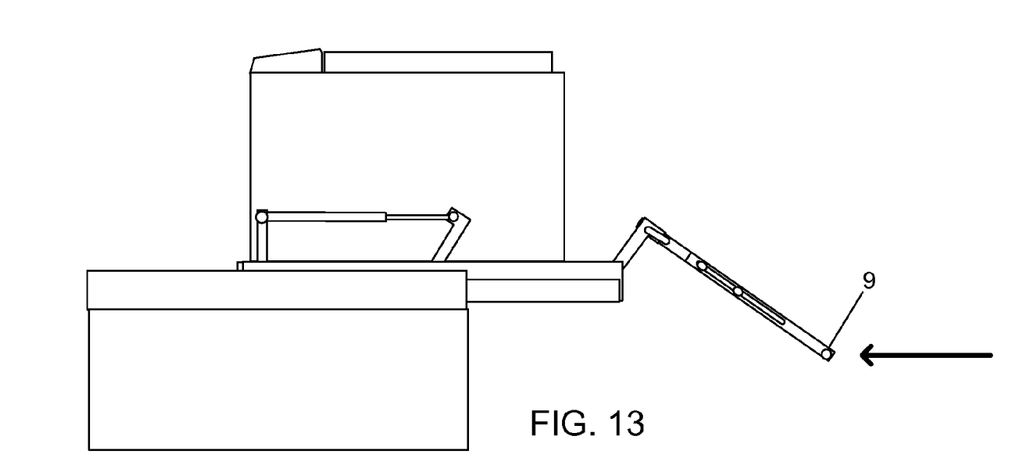

In FIG. 13, the user is pushing handle 9 to the left. The cooler is moving to the left along locking slide track 4.

Figure 14:
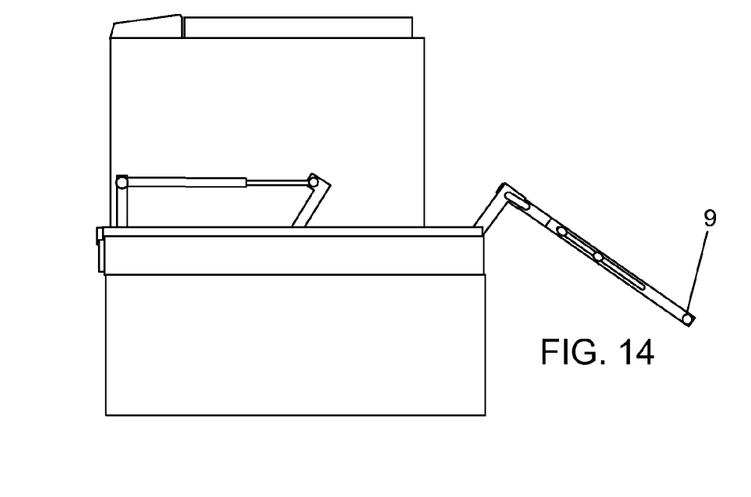

In FIG. 14, the user has finished pushing cooler 50 to the left. The user is now able to lock storage device 20 so that it stays in place while the vehicle is in motion. According, the user turns cam lever 35 so that it is in the position shown in FIG. 4B. This causes rods 37 and 38 to engage rod tabs 41 and 42, respectively. The user also presses on tabs 5 to lock locking slide track 4 into place.

Figure 14B:
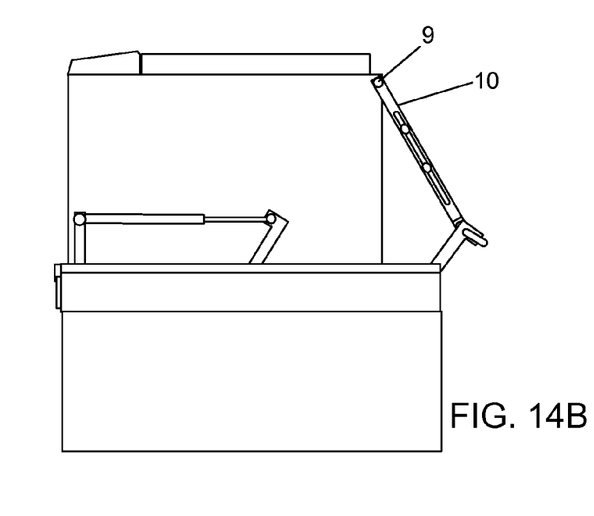

In FIG. 14B, the user has leaned expandable arm 10 against with handle 9 against cooler 50. The user can now close his rear hatch and drive to his destination.

After driving to his destination, the user can access cooler 50 by lowering platform 12 in same manner as described above.

Other Preferred Embodiments

Sliding Cutting Board

Figures 15, 16, 17:
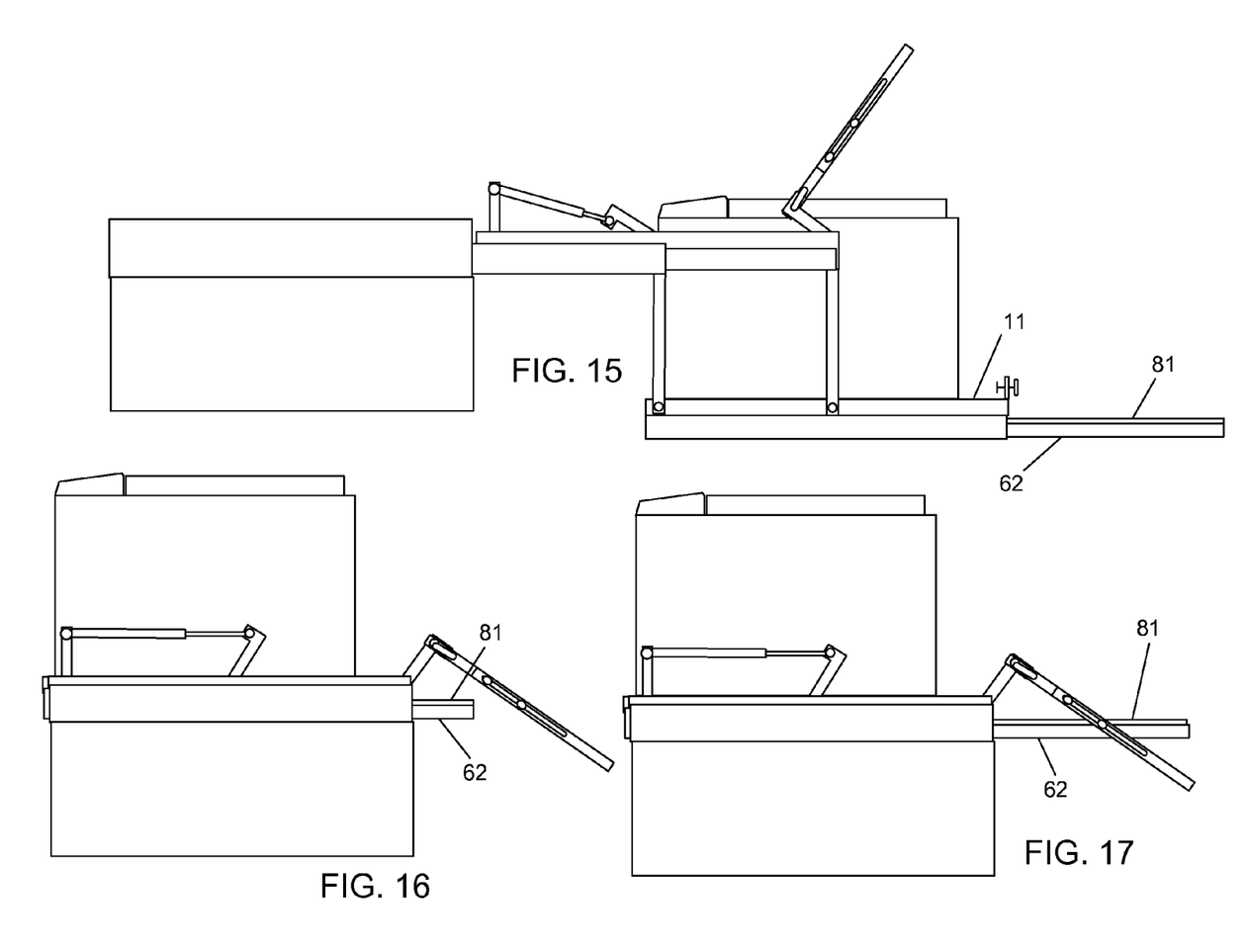
FIGS. 15-17 show another preferred embodiment of the present invention.

In another preferred embodiment shown in FIGS. 15-17, cutting board 81 is attached to locking slide track 62. Locking slide track 62 is connected to the underside of platform support 11. Cutting board 81 can be accessed while storage device 20 is in the position shown in FIG. 15 or when storage device 20 is in the position shown in FIGS. 16-17. FIGS. 16-17 show cutting board 81 as it is slid horizontally.

Non-Expandable Handle

Figures 18, 19:
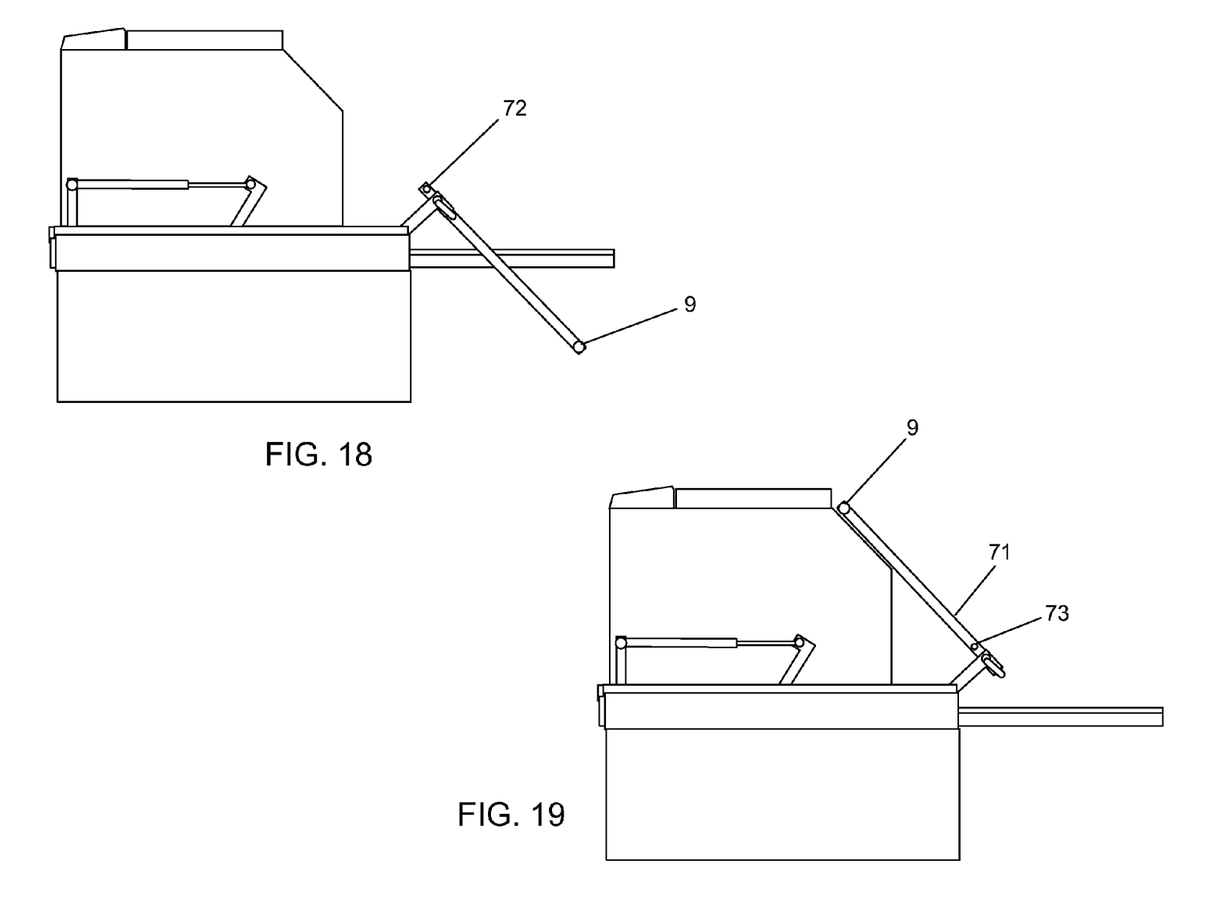
FIGS. 18-19 show another preferred embodiment of the present invention.
Figure 20:
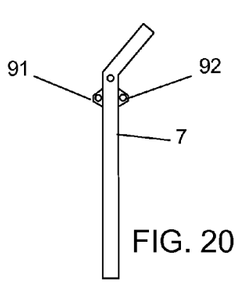
FIGS. 20-24 show another preferred embodiment of the present invention.

Although the above preferred embodiments described expandable arm 10, it is also possible to utilize a non-expandable handle 71. FIGS. 18 and 19 show non-expandable handle. Non-expandable handle 71 is lockable in both positions shown in FIGS. 18 and 19 by utilization of pull pin 15 and holes 72 and 73.

Multiple Cam Locking

In the first preferred embodiment, FIG. 3 showed rod tabs 41 and 42 attached to front swing arms 7. It was described how rod tabs 41 and 42 include holes for receiving rods 37 and 38 of cam 36. In the preferred embodiment shown in FIGS. 20-24, each forward swing arm 7 includes rod tabs 91 and 92.

Figure 21:
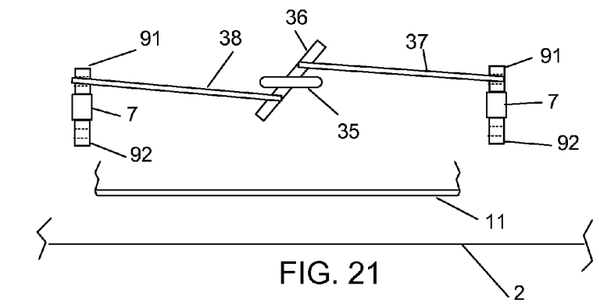

In FIG. 21, storage device 20 is in the position shown in FIG. 14. Platform support 11 is positioned over the surface of storage shelves 2. Prior to driving the vehicle the user wishes to rest platform support 11 onto the top of storage shelves 2.

Figure 22:
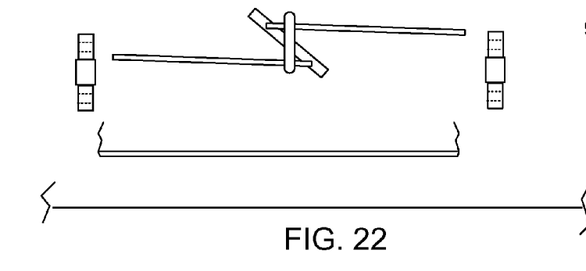

In FIG. 22, the user has turned cam lever 35 as shown. Rods 37 and 38 are now disengaged from rod tabs 91.

Figure 23:
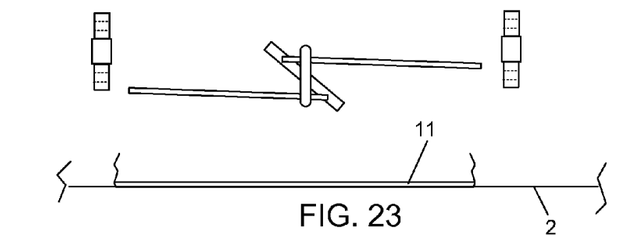

In FIG. 23, the user has lifted slightly up on handle 9 causing platform support 11 to lower so that it is resting on the surface of storage shelves 2.

Figure 24:
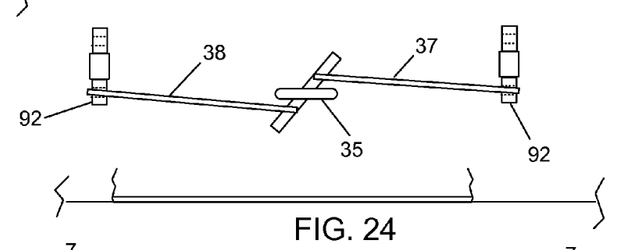

In FIG. 24, the user has turned cam lever 35 so that rods 37 and 38 are now positioned through the holes in rod tabs 92 thereby securely locking storage device 20 in position.

Cam Locking with Cutting Board Slide Attached

Figure 25:
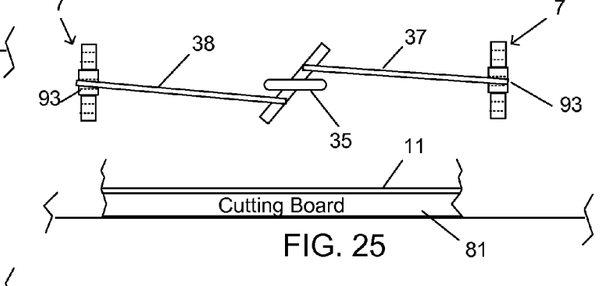
FIGS. 25-26 show another preferred embodiment of the present invention.
Figure 26:
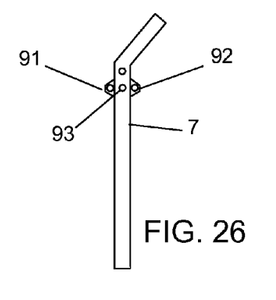

FIGS. 25 and 26 shows front swing arm 7 with hole 93. Hole 93 is for receiving cam rods 37 and 38 when cutting board 81 is attached to the bottom of platform support 11. Because cutting board 81 has significant thickness, the height of receiving rods 37 and 38 correspondingly increase as well. Therefore, holes 93 are situated higher than tabs 92 and at the correct height for receiving rods 37 and 38.

Although the above-preferred embodiments have been described with specificity, persons skilled in this art will recognize that many changes to the specific embodiments disclosed above could be made without departing from the spirit of the invention. For example, although the above preferred embodiments showed storage device 20 being utilized inside of an SUV automobile, it should be understood that storage device 20 can be placed in a variety of areas. Storage device 20 can be utilized for storing items in various types of work vehicles. Storage device 20 can be placed in workshops, garages, basements, stock rooms, motor homes, closets and various areas for disabled access.

Therefore, the attached claims and their legal equivalents should determine the scope of the invention.

What is claimed is:

1. A storage device for moving a heavy item from a low easy access point to a high storage surface, said storage device comprising:
    A) a base frame rigidly mounted to said high storage surface,
    B) a slide connected to said base frame,
    C) a sliding frame connected to said slide,
    D) a plurality of rear swing arms pivotally connected to said sliding frame, E) a damper pivotally connected between said plurality of rear swing arms and said sliding frame,
F) a plurality of front swing arms pivotally connected to said sliding frame,
G) a platform support frame pivotally connected to said front swing arms and said rear swing arms,
H) a platform supported by said platform support frame,
I) a pull down handle pivotally connected to said front swing arms, wherein the position of said pull down handle is lockable in at least one position, and
J) a cam locking device attached to said platform support frame, wherein said cam locking device locks said platform support frame to said front swing arms,
K) a first rod tab and a second rod tab attached to each of said front swing arms,
L) cam rods controlled by said cam locking device for engaging each of said first rod tab and the second rod tab,
wherein said cam locking device locks said platform support frame suspended above said high storage surface when said cam rods engage said first rod tabs and wherein said cam locking device locks said platform support frame on top of said high storage surface when said cam rods engage said second rod tabs, wherein a user manipulates said pull down handle to move said platform between said high storage surface and said low easy access point.

2. The storage device as in claim 1, wherein said slide transfers said sliding frame from a first slide position inside said base frame to a second slide position outside of said base frame.

3. The storage device as in claim 2, wherein said slide is lockable at said first slide position and lockable at said second slide position.

4. The storage device as in claim 1, wherein said damper is a gas damper.

5. The storage device as in claim 1, further comprising a middle cam rod receiving means situated between said first rod tab and said second rod tab, wherein said middle cam rod receiving means is for receiving said cam rods when a cutting board is connected to the bottom side of said platform.

6. The storage device as in claim 1, wherein said pull down handle is connected to said front swing arms via handle arms.

7. The storage device as in claim 6, wherein said handle arms are expandable.

8. The storage device as in claim 6, wherein said handle arms are non-expandable.

9. The storage device as in claim 1, wherein said heavy item is a cooler and said high storage surface is a surface of shelves, wherein said shelves are positioned in the luggage compartment of an automotive vehicle, wherein said storage device transfers said cooler between said surface of said shelves to said low easy access point.

10. The storage device as in claim 1, further comprising a cutting board slidingly mounted to the bottom of said platform support frame.

* * * * *